(12) United States Patent
Huang et al.

(10) Patent No.: US 11,962,023 B2
(45) Date of Patent: Apr. 16, 2024

(54) BOX BODY, BATTERY PACK, AND DEVICE

(71) Applicant: CONTEMPORARY AMPEREX TECHNOLOGY CO., LIMITED, Ningde (CN)

(72) Inventors: Haihua Huang, Ningde (CN); Wumei Fang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 276 days.

(21) Appl. No.: 17/699,804

(22) Filed: Mar. 21, 2022

(65) Prior Publication Data

US 2022/0216555 A1    Jul. 7, 2022

Related U.S. Application Data

(63) Continuation of application No. PCT/CN2020/124544, filed on Oct. 28, 2020.

(30) Foreign Application Priority Data

Nov. 21, 2019  (CN) .......................... 201922027008.8

(51) Int. Cl.
 *H01M 50/209*  (2021.01)
(52) U.S. Cl.
 CPC ...... *H01M 50/209* (2021.01); *H01M 2220/20* (2013.01)
(58) Field of Classification Search
 CPC ... H01M 50/20; H01M 50/204; H01M 50/209
 See application file for complete search history.

(56) References Cited

U.S. PATENT DOCUMENTS

2018/0138477 A1*  5/2018  Handning ........... H01M 50/224
2019/0334141 A1  10/2019  Kwon et al.

FOREIGN PATENT DOCUMENTS

| CN | 102842693 B |   | 8/2014 |
| CN | 106299192   | * | 1/2017 |
| CN | 106299192 A |   | 1/2017 |

(Continued)

OTHER PUBLICATIONS

Extended European Search Report of EP Application No. 20889314.9, dated Sep. 28, 2022, 6 pages.

(Continued)

*Primary Examiner* — Brittany L Raymond
(74) *Attorney, Agent, or Firm* — Ladas & Parry LLP (57) ABSTRACT

This application relates to the technical field of energy storage devices, and in particular, to a box body, a battery pack, and a device. The box body includes a first beam and a second beam. The first beam and the second beam intersect each other, and are connected by a connecting portion, and partition the box body into a plurality of accommodation spaces. The first beam includes a body and a recess. The recess is recessed inward relative to the body. The connecting portion is disposed in the recess. In this way, a joint position between the first beam and the second beam will not protrude from a lateral surface of the first beam, thereby preventing a short circuit of a battery cell caused by puncture of or damage to an insulation film outside the battery cell, and improving safety performance of the battery.

9 Claims, 5 Drawing Sheets

(56) References Cited

FOREIGN PATENT DOCUMENTS

| | | | |
|---|---|---|---|
| CN | 106711368 A | | 5/2017 |
| CN | 206179942 | * | 5/2017 |
| CN | 206179942 U | | 5/2017 |
| CN | 108565524 A | | 9/2018 |
| CN | 209183605 U | | 7/2019 |
| CN | 210744037 U | | 6/2020 |
| JP | H09104240 A | | 4/1997 |

OTHER PUBLICATIONS

ISR for International Application PCT/CN2020/124544 dated Jan. 27, 2021.
Written Opinion for International Application PCT/CN2020/124544 dated Jan. 27, 2021.

\* cited by examiner

BOX BODY, BATTERY PACK, AND DEVICE

CROSS-REFERENCE TO RELATED APPLICATIONS

This application is a continuation of International Patent Application No. PCT/CN2020/124544 filed on Oct. 28, 2020, which claims priority to Chinese Patent Application No. 201922027008.8, filed on Nov. 21, 2019. The aforementioned patent applications are incorporated herein by reference in their entirety.

TECHNICAL FIELD

This application relates to the field of energy storage devices, and in particular, to a box body, a battery pack, and a device.

BACKGROUND

After being connected in series and in parallel, battery modules are mounted in a battery box. A battery module includes battery cells as well as end plates and side plates configured to fix the battery cells.

To reduce weight, the end plates and side plates may be omitted. The battery cells may be directly mounted in the battery box after being grouped. However, burrs tend to occur at a joint in a structure in a box body. The burrs may puncture or damage an insulation film outside the battery cells, and lead to a short circuit of the battery cells and cause a battery safety problem.

SUMMARY

This application provides a box body, a battery pack, and a device to solve problems in the prior art and improve safety of a battery.

One aspect of this application provides a box body applied to a battery pack, including a first beam and a second beam.

The first beam and the second beam intersect each other, and are connected by a connecting portion, and partition the box body into a plurality of accommodation spaces.

The first beam includes a body and a recess. The recess is recessed inward relative to the body. The connecting portion is disposed in the recess.

In a possible implementation, the recess includes recess faces. The recess faces are located on two sides of the recess. The connecting portion is disposed on each recess face.

In a possible implementation, a first slot is disposed in the recess, and a second slot is disposed on the second beam. The first beam and the second beam are plug-connected through the first slot and the second slot.

In a possible implementation, first mounting plates are disposed on two sides of the second slot.

The first mounting plates are connected to the recess.

In a possible implementation, the connecting portion is disposed at an edge of each first mounting plate.

In a possible implementation, a second mounting plate is disposed at a bottom of the second beam.

A bottom plate is further disposed at a bottom of the box body, and the second mounting plate is connected to the bottom plate.

In a possible implementation, a notch is disposed on the second mounting plate, and the notch is configured to avoid the recess.

In a possible implementation, a width of the notch is greater than a width of the recess.

In a possible implementation, the connecting portion is a weld.

Another aspect of this application provides a battery pack, including: the box body described above; and a battery cell accommodated in an accommodation space of the box body.

Still another aspect of this application provides a device. The device includes the battery pack described above. The battery pack is configured to provide electrical energy.

The technical solutions provided in this application achieve the following beneficial effects:

In the box body, the battery pack, and the device according to this application, the box body includes the first beam and the second beam. The first beam and the second beam intersect each other, and are connected by the connecting portion, and partition the box body into a plurality of accommodation spaces. The first beam includes a body and a recess. The recess is recessed inward relative to the body. The connecting portion is disposed in the recess. In this way, a joint position between the first beam and the second beam will not protrude from a lateral surface of the first beam, thereby preventing a short circuit of a battery cell caused by puncture of or damage to an insulation film outside the battery cell, and improving safety performance of the battery.

Understandably, the above general description and the following detailed description are merely exemplary without limiting this application.

BRIEF DESCRIPTION OF DRAWINGS

To describe the technical solutions in the embodiments of this application more clearly, the following outlines the accompanying drawings to be used in the description of the embodiments of this application. Apparently, the accompanying drawings outlined below are merely some embodiments of this application, and a person of ordinary skill in the art may derive other drawings from these accompanying drawings without making any creative efforts.

REFERENCE NUMERALS

100: Battery pack;
1: Box body;
11: First beam;
111: Body;
112: Recess;

112a: Recess face;
113: First slot;
114: Third mounting plate;
12: Second beam;
121: Second slot;
122: First mounting plate;
123: Second mounting plate;
123a: Notch;
13: Bottom plate;
14: Connecting part;
15: Accommodation space; and
2: Battery cell.

The drawings described here are incorporated into the specification as a part of the specification. The drawings illustrate embodiments of this application and are used together with the specification to interpret the principles of this application.

DETAILED DESCRIPTION

The following explicitly and fully describes the technical solutions of this application with reference to accompanying drawings. Apparently, the described embodiments are a part rather than all of the embodiments of this application. All other embodiments derived by a person of ordinary skill in the art based on the embodiments of this application without making any creative efforts shall fall within the protection scope of this application.

The terms used in the embodiments of this application are intended only for describing specific embodiments rather than for limiting this application. Unless otherwise expressly indicated in the context, the words "a", "the", and "this" that precede a singular noun in the embodiments and claims of this application are intended to include the plural form thereof.

Understandably, the term "and/or" used herein merely describes an association relationship between associated objects and indicates existence of three relationships. For example, "A and/or B" may indicate existence of A alone, coexistence of A and B, and existence of B alone. In addition, the character "/" herein generally indicates an "or" relationship between the object preceding the character and the object following the character.

It needs to be noted that localizers such as "on", "above", "under", "below", "left", and "right" used in the embodiments of this application are described from a perspective shown in the accompanying drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element.

An embodiment of this application provides a device. The device may be an electric vehicle, a ship, a small aircraft, an energy storage cabinet, or the like. Using a vehicle as an example, the vehicle may include a battery pack and a vehicle body. The battery pack is disposed in the vehicle body. A driving motor is further disposed in the vehicle body, and the driving motor is electrically connected to the battery pack and is powered by the battery pack. The driving motor is connected to wheels of the vehicle body through a transmission mechanism to drive the vehicle to run. In a specific embodiment, the battery pack may be disposed at a bottom of the vehicle body.

Figure 1:
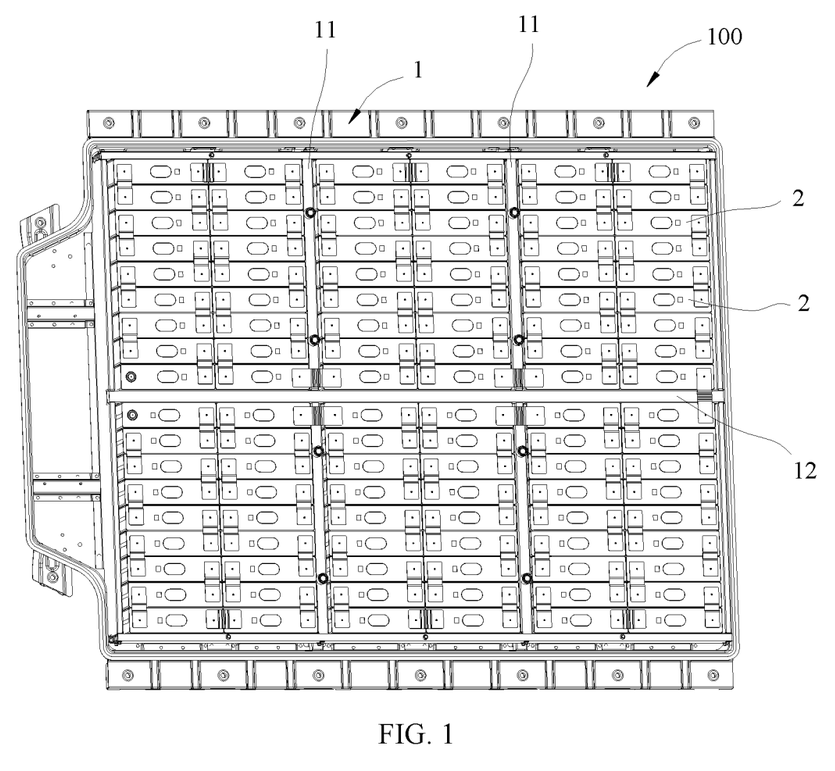
FIG. 1 is a schematic structural diagram of a battery pack according to an embodiment of this application.

FIG. 1 is a schematic structural diagram of a battery pack according to an embodiment of this application. As shown in FIG. 1, this embodiment of this application provides a battery pack 100, including a box body 1 and a battery cell 2. The battery cell 2 is accommodated in an accommodation space 15 of the box body 1. The battery cell 2 may be plural in number, and the plurality of battery cells 2 are stacked on each other and accommodated in the accommodation space 15. The battery pack 100 may further include an upper cover (not shown). The upper cover is connected to the box body 1 and encloses the battery cell 2 in the box body 1.

In the prior art, to reduce weight, end plates and side plates configured to fix the battery cell 2 are omitted, and the battery cell 2 is directly disposed in the box body 1. This brings a problem that burrs of the box body 1 may puncture or damage the battery cell 2. The box body, the battery pack, and the device according to this embodiment of this application can solve the such technical problem in the prior art.

Figure 2:
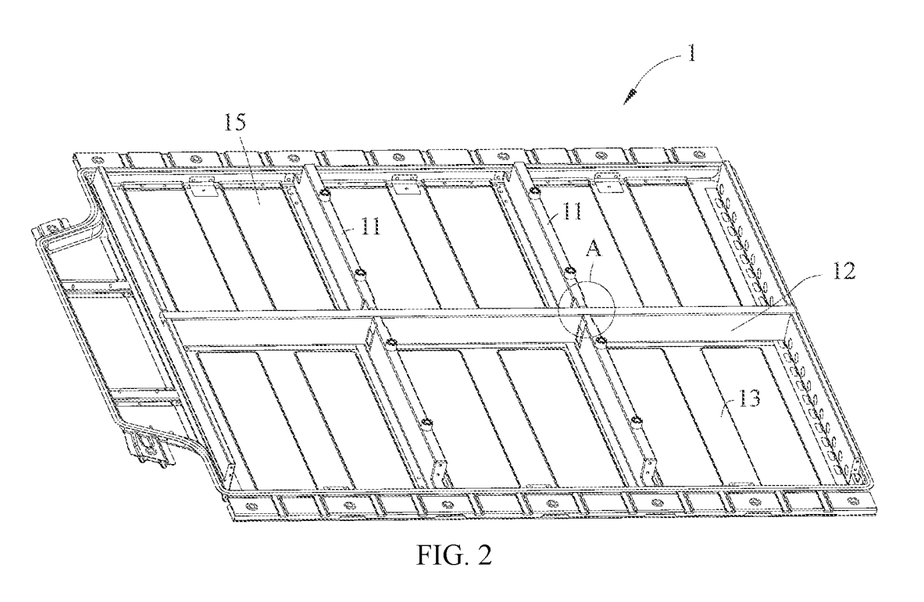
FIG. 2 is a schematic structural diagram of a box body applied to a battery pack according to an embodiment of this application.
Figure 3:
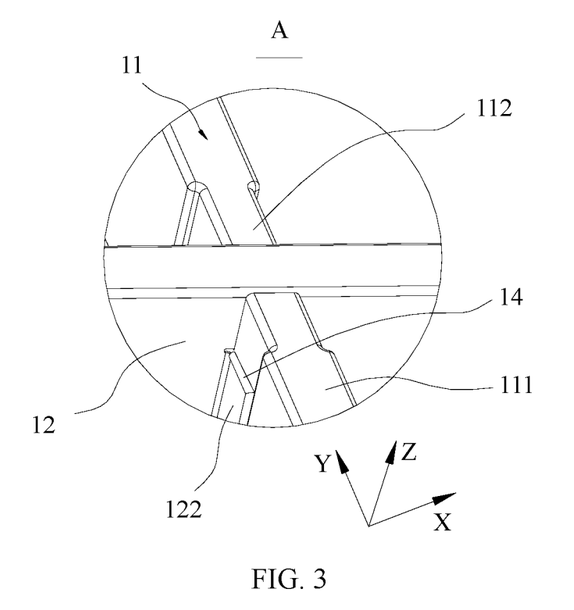
FIG. 3 is a local detailed view of a part A shown in FIG. 2.

FIG. 2 is a schematic structural diagram of a box body applied to a battery pack according to an embodiment of this application, and FIG. 3 is a local detailed view of a part A shown in FIG. 2. As shown in FIG. 1 and FIG. 2, an embodiment of this application further provides the box body 1 applied to the battery pack 100. The box body 1 includes a first beam 11 and a second beam 12. In an embodiment, the first beam 11 may be a cross beam extending in a width direction Y of the battery pack 100. The second beam 12 is a longitudinal beam extending in a length direction X of the battery pack 100. In other embodiments, the first beam 11 may be a longitudinal beam, and correspondingly, the second beam 12 is a cross beam. This is not further limited herein.

As shown in FIG. 2 and FIG. 3, in this embodiment, the first beam 11 is a cross beam, and the second beam 12 is a longitudinal beam. The first beam 11 extends in the width direction Y of the battery pack 100, and the second beam 12 extends in the length direction X of the battery pack 100. The first beam 11 may be one or more in number, and the second beam 12 may also be one or more in number. The first beam 11 and the second beam 12 intersect each other, and are connected by a connecting portion 14, and partition the box body 1 into a plurality of accommodation spaces 15 configured to accommodate the battery cells 2.

As shown in FIG. 3, the first beam 11 includes a body 111 and a recess 112. The body 111 and the recess 112 may be integrally formed. The recess 112 is recessed inward relative to the body 111. The connecting portion 14 is disposed in the recess 112.

With the box body 1 provided in this embodiment of this application, the recess 112 is disposed on the first beam 11. The connecting portion 14 is disposed in the recess 112. In this way, a joint position between the first beam 11 and the second beam 12 will not protrude from a lateral surface of the first beam 11. In a case that no end plates or side plates are available for protection, the box body 1 according to this embodiment of this application can prevent burrs of the box body 1 from puncturing or damaging an insulation film outside the battery cell 2 and prevent a short circuit of the battery cell 2 arising therefrom, thereby improving safety performance of the battery.

In this embodiment, the first beam 11 is a cross beam. As shown in FIG. 3, the recess 112 is recessed in the length direction X. In other embodiments, the recess 112 may be disposed on the second beam 12, and the second beam 12 is a longitudinal beam. The recess 112 is recessed in the width direction Y.

Figure 4:
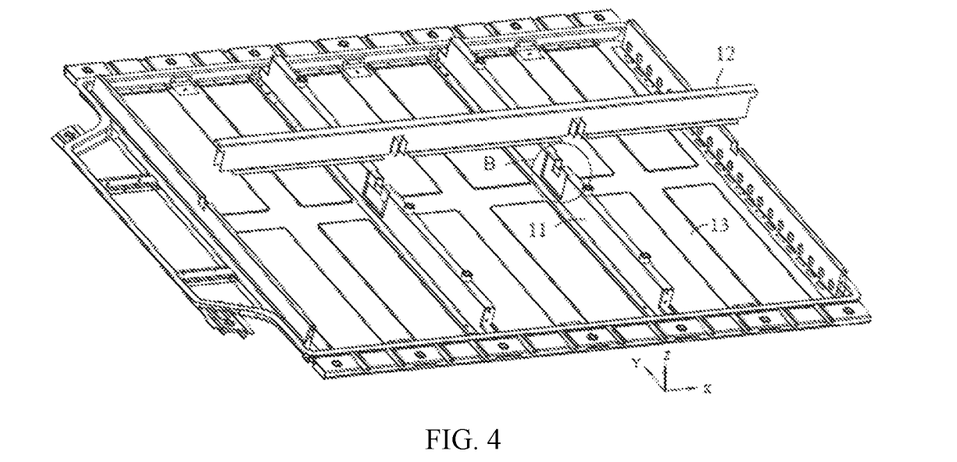
FIG. 4 is a schematic exploded view of a box body applied to a battery pack according to an embodiment of this application.
Figure 5:
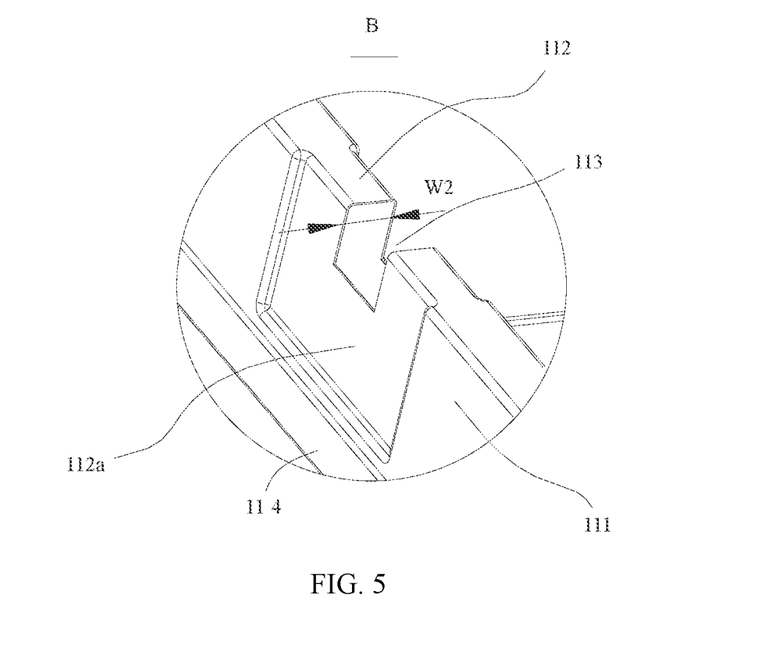
FIG. 5 is a local detailed view of a part B shown in FIG. 4.

FIG. 4 is a schematic exploded view of a box body applied to a battery pack according to an embodiment of this application, and FIG. 5 is a local detailed view of a part B shown in FIG. 4. As shown in FIG. 4 and FIG. 5, in a specific implementation, the recess 112 includes recess faces 112a. The recess faces 112a are located on two sides of the recess 112. The connecting portion 14 is disposed on each recess face 112a. The recess face 112a may be approximately parallel to an extension direction of the first beam 11.

The recess face 112a may be integrally formed by stamping on the body 111. The recess face 112a disposed can provide an enough space for accommodating the connecting portion 14, and prevent the connecting portion 14 from protruding beyond two sides of the body 111 of the first beam 11. After the battery cell 2 is mounted into the box body 1, the connecting portion 14 will not damage the insulation film outside the battery cell 2.

Figure 7:
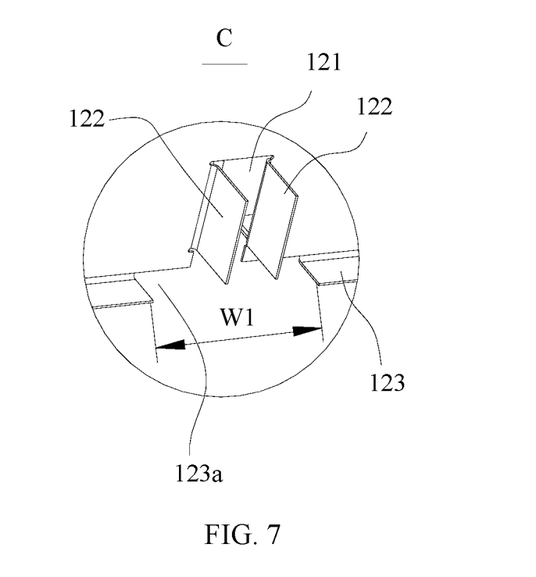
FIG. 7 is a local detailed view of a part C shown in FIG. 6.

As shown in FIG. 5, in a specific implementation, a first slot 113 is disposed in the recess 112. The first slot 113 may be cut out in the recess 112. As shown in FIG. 7, a second slot 121 is disposed on the second beam 12. The second slot 121 may be cut out on the second beam 12. The first beam 11 and the second beam 12 are plug-connected through the first slot 113 and the second slot 121. After the first slot 113 and the second slot 121 are plug-connected, the first beam 11 is connected to the second beam 12 by the connecting portion 14.

In this embodiment, the first beam 11 may be plural in number. A plurality of first beams 11 are approximately parallel to each other. The second beam 12 may be one in number. With the second slot 121 disposed on the second beam 12, the second beam 12 can be connected to the plurality of first beams 11 in an integral structure without disconnecting the second beam 12, thereby enhancing overall strength of the first beam 11 and the second beam 12. In addition, by disposing the first slot 113 in the recess 112 of the first beam 11 and disposing the second slot 121 on the second beam 12, this application reduces an overall height of the first beam 11 and the second beam 12, and reduces an overall space occupied by the box body 1 on the device (such as an electric vehicle).

Figure 6:
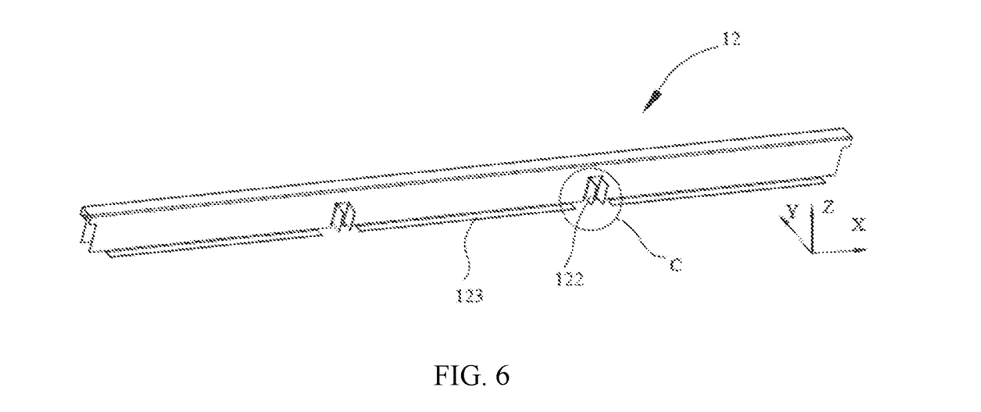
FIG. 6 is a schematic structural diagram of a longitudinal beam in a box body according to an embodiment of this application.

FIG. 6 is a schematic structural diagram of a longitudinal beam in a box body according to an embodiment of this application, and FIG. 7 is a local detailed view of a part C shown in FIG. 6. In a specific implementation, as shown in FIG. 6 and FIG. 7, first mounting plates 122 are disposed on two sides of the second slot 121. The first mounting plates 122 are connected to the recess 112.

In this embodiment, the first mounting plates 122 may be directly formed on the two sides of the second slot 121 by folding. Each first mounting plate 122 may be fitted snugly with a corresponding recess face 112a of the recess portion 112, and the connecting portion 14 is disposed peripherally around the first mounting plate 122. The first mounting plate 122 disposed can prevent the connecting portion 14 from being disposed at a right-angled joint between the first beam 11 and the second beam 12. The connecting portion 14 is disposed in the recess 112 rather than at the right-angled joint between the first beam 11 and the second beam 12, thereby not only avoiding stress concentration but also increasing a connection area of the connecting portion 14 and improving connection strength between the beam 11 and the second beam 12.

In a specific implementation, referring to FIG. 3, the connecting portion 14 is disposed at an edge of each first mounting plate 122. Specifically, the first mounting plate 122 is approximately a rectangular plate shape, and is directly formed by folding from the position of the second slot 121. The connecting portion 14 may be disposed at all remaining three edges of the first mounting plate 122 other than the edge connected to the second slot 121.

In this embodiment, the connecting portions 14 may be welds, and are formed by welding at the three edges around the first mounting plate 122. A person skilled in the art understands that the welds serving as the connecting portions 14 may be continuous welds or segmented welds. This is not further limited herein.

In this way, the weld connects the first mounting plate 122 and the recess face 112a of the recess portion 112, and is located on the recess face 112a. The weld serving as the connecting portion 14 does not protrude from the lateral face of the body 111 or protrude from a side of the first mounting plate 122, the side being oriented toward the battery cell 2. Therefore, the insulation film of the battery cell 2 will not be damaged.

In a specific implementation, referring to FIG. 6, a second mounting plate 123 is disposed at the bottom of the second beam 12. Referring to FIG. 4, a bottom plate 13 is further disposed at the bottom of the box body 1. The second mounting plate 123 is connected to the bottom plate 13.

The second mounting plate 123 may be formed at the bottom of the second beam 12 by bending. The second beam 12 is connected to the bottom plate 13 through the second mounting plate 123, thereby improving reliability of the connection between the second beam 12 and the bottom plate 13. The second mounting plate 123 may be connected to the bottom plate 13 by welding or by other means.

In a specific implementation, referring to FIG. 5, a third mounting plate 114 is disposed at the bottom of the first beam 11. The third mounting plate 114 is connected to the bottom plate 13. The third mounting plate 114 may be formed at the bottom of the first beam 11 by bending. The first beam 11 is connected to the bottom plate 13 through the third mounting plate 114, thereby improving reliability of the connection between the first beam 11 and the bottom plate 13. The third mounting plate 114 may be connected to the bottom plate 13 by welding or by other means.

In a specific implementation, referring to FIG. 7, a notch 123a is disposed on the second mounting plate 123, and the notch 123a is configured to avoid the recess 112. The notch 123a may be formed by cutting on the second mounting plate 123 after the second mounting plate 123 is formed by bending. Alternatively, the notch 123a may be formed first by cutting, and then a segmented second mounting plate 123 is formed by bending.

As shown in FIG. 4, at the time of connecting the second beam 12 to the first beam 11, referring to the status shown in FIG. 4, the second slot 121 of the second beam 12 may be inserted into the first slot 113 of the first beam 11 from top to bottom. In the process of plug-connecting the two slots, because the notch 123a is disposed on the second mounting plate 123 and can avoid the recess 112 without causing interference between the second mounting plate 123 and the recess 112, the assembly of the second beam 12 and the first beam 11 is facilitated.

In a specific implementation, as shown in FIG. 5 and FIG. 7, a width W1 of the notch 123a is set to be greater than a width W2 of the recess 112, the assembly of the second beam 12 and the first beam 11 is more facilitated. After the second slot 121 of the second beam 12 is plug-connected to the first slot 113 of the first beam, the connecting portion 14 can be formed by welding, thereby connecting the first beam 11 to the second beam 12.

In conclusion, in the box body 1, the battery pack 100, and the device according to the embodiments of this application, the box body 1 includes the first beam 11 and the second beam 12. The first beam 11 and a second beam 12 intersect each other, and are connected by the connecting portion 14, and partition the box body 1 into a plurality of accommodation spaces 15. The accommodation spaces 15 can accommodate the battery cells 2. The first beam 11 includes the body 111 and the recess 112. The recess 112 is recessed inward relative to the body 111. The connecting portion 14 is disposed in the recess 112. With the recess 112 disposed on the first beam 11, and with the connecting portion 14 disposed in the recess 112, the joint position between the first beam 11 and the second beam 12 will not protrude from the lateral surface of the first beam 11, thereby preventing a short circuit of a battery cell caused by puncture of or damage to the insulation film outside the battery cell 2, and improving safety performance of the battery.

The foregoing descriptions are merely exemplary embodiments of this application, but are not intended to limit this application. A person skilled in the art understands that this application may have various modifications and variations. Any modifications, equivalent replacements, improvements, and the like made without departing from the spirit and principles of this application fall within the protection scope of this application.

What is claimed is:

1. A box body applied to a battery pack, comprising:
a first beam and a second beam,
wherein
the first beam and the second beam intersect each other, and are connected by a connecting portion, and partition the box body into a plurality of accommodation spaces; and
the first beam comprises a body and a recess, the recess is recessed inward relative to the body, and the connecting portion is disposed in the recess;
wherein a first slot is disposed in the recess, a second slot is disposed on the second beam, and the first beam and the second beam are plug-connected through the first slot and the second slot,
wherein first mounting plates are disposed on two sides of the second slot, and the first mounting plates are connected to the recess.

2. The box body according to claim 1, wherein the recess comprises recess faces, the recess faces are located on two sides of the recess, and the connecting portion is disposed on each recess face.

3. The box body according to claim 1, wherein the connecting portion is disposed at an edge of each first mounting plate.

4. The box body according to claim 1, wherein a second mounting plate is disposed at a bottom of the second beam, and a bottom plate is further disposed at a bottom of the box body, and the second mounting plate is connected to the bottom plate.

5. The box body according to claim 4, wherein a notch is disposed on the second mounting plate, and the notch is configured to avoid the recess.

6. The box body according to claim 5, wherein a width of the notch is greater than a width of the recess.

7. The box body according to claim 1, wherein the connecting portion is a weld.

8. A battery pack, comprising:
the box body according to claim 1; and
a battery cell accommodated in an accommodation space of the box body.

9. A device, comprising the battery pack according to claim 8, wherein the battery pack is configured to provide electrical energy.

* * * * *